US008315748B2

(12) United States Patent
Lee (10) Patent No.: US 8,315,748 B2
(45) Date of Patent: Nov. 20, 2012

(54) ALTITUDE MEASUREMENT APPARATUS AND METHOD

(75) Inventor: Hyeon-Cheol Lee, Dajeon (KR)

(73) Assignee: Korea Aerospace Research Institute (KR)

( * ) Notice: Subject to any disclaimer, the term of this patent is extended or adjusted under 35 U.S.C. 154(b) by 254 days.

(21) Appl. No.: 12/791,688

(22) Filed: Jun. 1, 2010

(65) Prior Publication Data

US 2011/0166722 A1 Jul. 7, 2011

(30) Foreign Application Priority Data

Jan. 7, 2010 (KR) .................. 10-2010-0001175

(51) Int. Cl.
 *G05D 1/00* (2006.01)
(52) U.S. Cl. ................. 701/4; 701/15; 701/16
(58) Field of Classification Search .......... 701/4, 15–16
 See application file for complete search history.

(56) References Cited

U.S. PATENT DOCUMENTS

| 7,373,242 B2* | 5/2008 | Yamane ...................... 701/509 |
| 7,642,929 B1* | 1/2010 | Pinkus et al. ................. 340/973 |
| 8,000,867 B2* | 8/2011 | Lee ................................. 701/58 |
| 2005/0125142 A1* | 6/2005 | Yamane ....................... 701/200 |
| 2009/0002220 A1* | 1/2009 | Lovberg et al. ................. 342/33 |

FOREIGN PATENT DOCUMENTS

| KR | 100369252 | 8/2003 |
| KR | 1020100002564 | 7/2010 |

OTHER PUBLICATIONS

Lee, "New Range Measurement Method between Aircraft and Runway", 2009, pp. 115-120, http://library.kari.re.kr.
Korean Official Action dated Oct. 13, 2011, 5 pgs.

* cited by examiner

*Primary Examiner* — Hussein A. Elchanti
(74) *Attorney, Agent, or Firm* — Hayes Soloway P.C.

(57) ABSTRACT

Provided is an altitude measurement apparatus and method that may measure an altitude of an aircraft without using a separate altimeter. The altitude measurement apparatus may include a camera unit being provided to a vertical takeoff and landing (VTOL) aircraft to collect an image of a circular mark formed on the ground, and a calculation unit to calculate an altitude of the VTOL aircraft based on the collected image. Accordingly, the altitude measurement apparatus may measure the altitude using a simple structure such as the circular mark formed on the ground, and be configured at inexpensive costs.

6 Claims, 7 Drawing Sheets

ALTITUDE MEASUREMENT APPARATUS AND METHOD

CROSS-REFERENCE TO RELATED APPLICATION

This application claims the benefit of Korean Patent Application No. 10-2010-0001175, filed on Jan. 7, 2010, in the Korean Intellectual Property Office, the disclosure of which is incorporated herein by reference.

BACKGROUND

1. Field of the Invention

The present invention relates to an altitude measurement apparatus of a vertical takeoff and landing (VTOL) aircraft, and more particularly, to an altitude measurement apparatus that may easily calculate an altitude of a VTOL aircraft without using an expensive equipment such as a separate altimeter.

2. Description of the Related Art

A conventional altitude measurement scheme may measure an altitude using reception data of a Global Positioning System (GPS), a pressure altitude sensor, electromagnetic waves, and the like.

In the case of using the GPS, altitude information may be provided. However, when the GPS does not correspond to an expensive GPS receiver, or when the altitude is low, a great error may occur. In addition, in dynamic environments, the error range may increase and a number of visible satellites may be limited. As technology to complete the above disadvantages and to enhance accuracy, a Differential Global Positioning System (DGPS) may be employed. In this case, since a GPS base station needs to be separately installed and a predetermined range with the GPS base station is limited, the DGPS may be spatially limited.

In the case of using the pressure altitude sensor, the pressure altitude sensor is very sensitive to an external environment and noise. Consequently, since variation of data is great and an error frequently occurs in a low altitude, a reliability issue may occur. In addition, the atmospheric pressure frequently varies depending on surrounding environments such as a region, a temperature, wind, and the like. Accordingly, when the pressure altitude sensor is used alone, the error range may generally be greater than or equal to ±10 m and thus it is very difficult to accurately measure the altitude.

When the altitude is measured using a radio altimeter that is generally used for a near distance, the altitude may be accurately calculated by calculating a distance based on a time used to emit radar waves and to receive returned radar waves. However, the radio altimeter is one of to expensive equipments. Accordingly, attempts have been made to enhance the accuracy and save costs in measuring the altitude.

SUMMARY

An aspect of the present invention provides an altitude measurement apparatus that may measure an altitude by simply changing a structure without using a separate altimeter.

Another aspect of the present invention also provides an altitude measurement apparatus that may reduce the error range even at a height close to the ground, for example, even in a low altitude less than or equal to 100 m, and thereby may accurately measure the altitude.

Another aspect of the present invention also provides an altitude measurement apparatus that may measure an altitude regardless of a change in an external environment such as an atmospheric pressure change, an altitude change, and a temperature change.

According to an aspect of the present invention, there is provided an altitude measurement apparatus, including: a camera unit being provided to a vertical takeoff and landing (VTOL) aircraft to collect an image of a circular mark formed on the ground; and a calculation unit to calculate an altitude of the VTOL aircraft based on the collected image.

The calculation unit may calculate the altitude of the VTOL aircraft based on an actual diameter of the circular mark, a distance between the circular mark and a takeoff and landing point, a horizontal diameter length of the image, a vertical diameter length of the image, and a pitch angle, a roll angle, and a yaw angle of the VTOL aircraft. The camera unit may be configured to have a resolution of at least 480×640.

The altitude measurement apparatus may further include an altimeter to measure the altitude of the VTOL aircraft. The altimeter may include at least one of a Global Positioning System (GPS), a Differential Global Positioning System (DGPS), a radio altimeter, and a pressure altitude sensor. The altitude measurement apparatus may compare the calculated altitude with the measured altitude to perform correction.

According to another aspect of the present invention, there is provided an altitude measurement apparatus to calculate an altitude of a VTOL aircraft, wherein the altitude measurement apparatus includes a camera unit to collect, as an image, a predetermined mark shape provided at a predetermined interval from a takeoff and landing point on ground, and performs calculation through comparison between the collected image and the original mark shape to calculate the altitude of the VTOL aircraft.

According to still another aspect of the present invention, there is provided an altitude measurement method, including: collecting, by an aircraft, an image of a circular mark formed on the ground; measuring a horizontal diameter length of the image and a vertical diameter length of the image based on the image; and calculating an altitude of the aircraft based on an actual diameter of the circular mark, a distance between the circular mark and a takeoff and landing point, the horizontal diameter length of the image, the vertical diameter length of the image, and a pitch angle, a roll angle, and a yaw angle of the aircraft.

The altitude measurement method may further include comparing the calculated altitude with the altitude measured by at least one of a GPS, a DGPS, a radio altimeter, and a pressure altitude sensor provided in the aircraft, and performing correction.

EFFECT

According to embodiments of the present invention, it is possible to measure an altitude through a structure such as a circular mark formed on the ground without using a separate altimeter. Accordingly, an altitude measurement apparatus may be configured at inexpensive costs.

According to embodiments of the present invention, it is possible to accurately measure an altitude by reducing the error range even at a height close to the ground, for example, even in a low altitude less than or equal to 100 m.

According to embodiments of the present invention, since an altitude may be measured using a camera unit configured to collect an image of a circular mark formed on the ground, it is possible to measure the altitude regardless of a change in an external environment such as an atmospheric pressure change, an altitude change, and a temperature change.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 1:
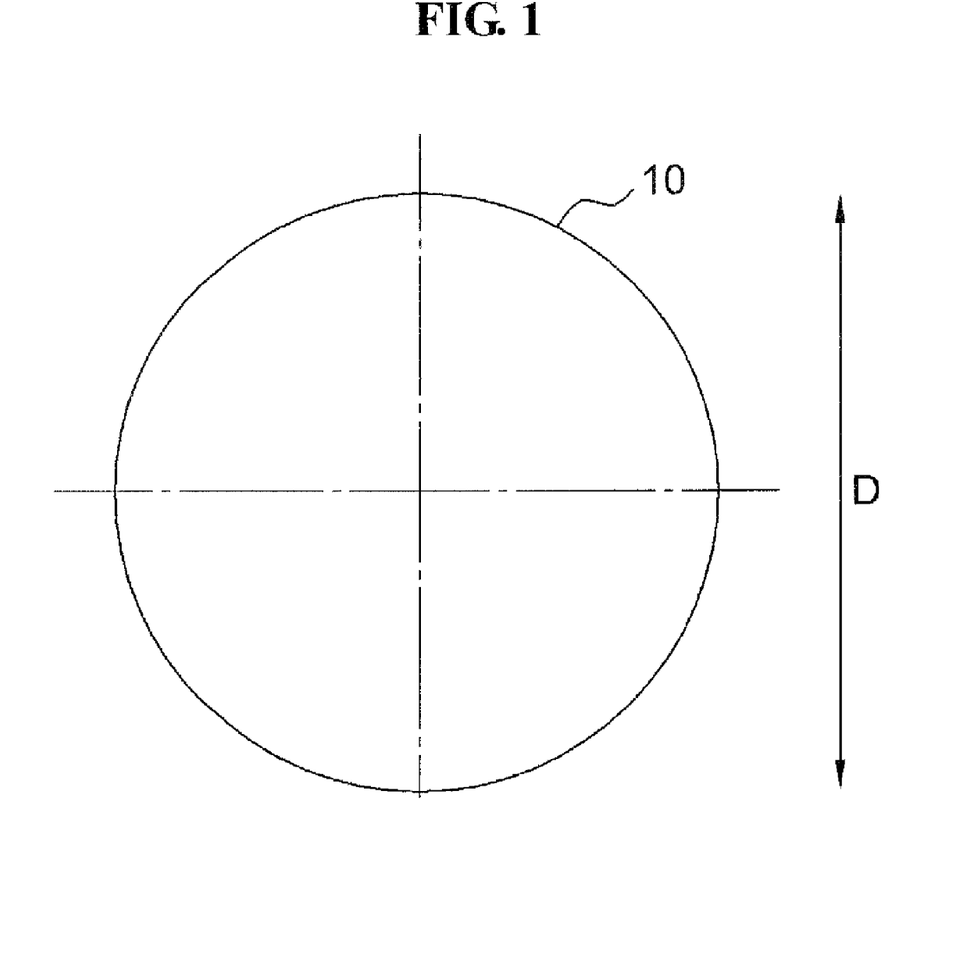
FIG. 1 is a diagram illustrating a circular mark of an altitude measurement apparatus according to an exemplary embodiment of the present invention.
Figure 2:
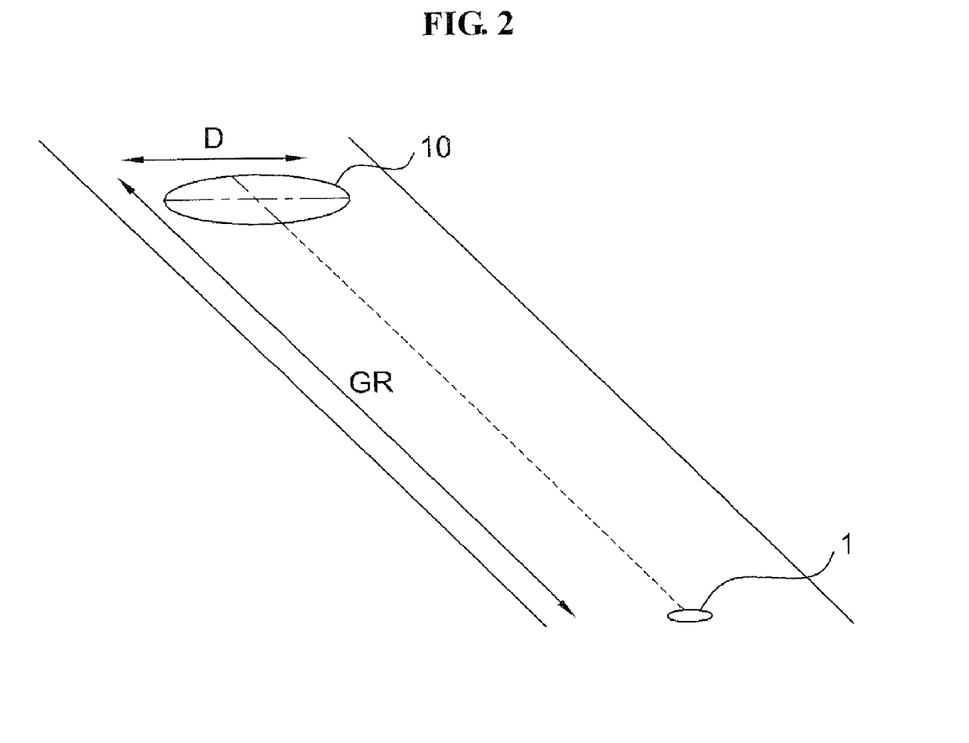
FIG. 2 is a diagram illustrating the circular mark of FIG. 1 and a takeoff and landing point.
Figure 3:
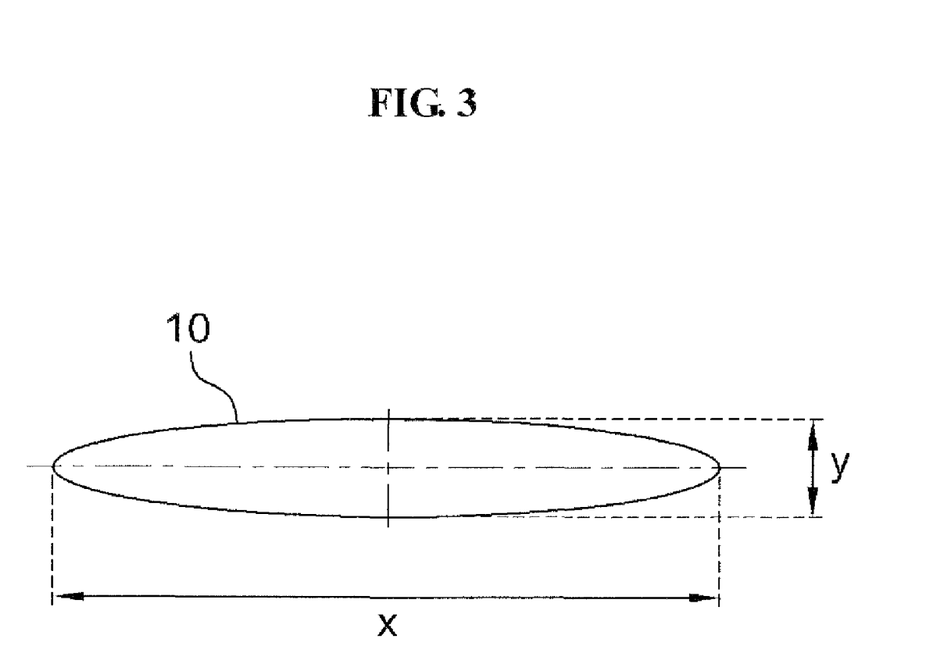
FIG. 3 is a diagram illustrating an example of an image of a circular mark collected by an altitude measurement apparatus according to an exemplary embodiment of the present invention.
Figure 4:
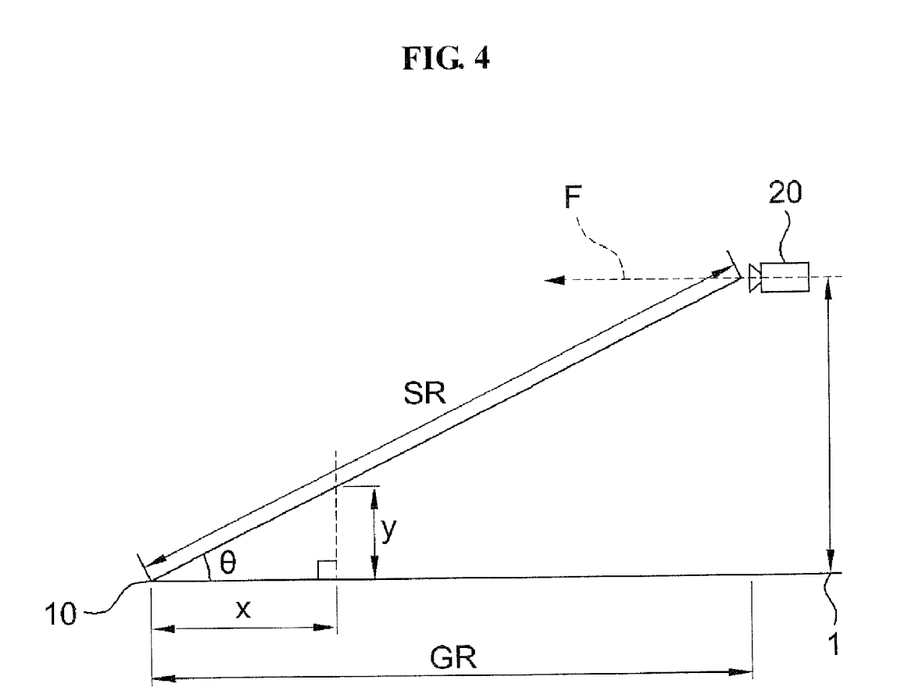
FIG. 4 is a diagram to describe a method of measuring, by an altitude measurement apparatus, an altitude according to an exemplary embodiment of the present invention.

Hereinafter, an altitude measurement apparatus according to an exemplary embodiment of the present invention will be described with reference to the accompanying drawings. FIG. 1 is a diagram illustrating a circular mark 10 of an altitude measurement apparatus according to an exemplary embodiment of the present invention, FIG. 2 is a diagram illustrating the circular mark of FIG. 1 and a takeoff and landing point, FIG. 3 is a diagram illustrating an example of an image of a circular mark collected by an altitude measurement apparatus according to an exemplary embodiment of the present invention, and FIG. 4 is a diagram to describe a method of measuring, by an altitude measurement apparatus, an altitude according to an exemplary embodiment of the present invention.

The altitude measurement apparatus may include a camera unit 20 to collect an image of the circular mark 10 formed on the ground, and a calculation unit (not shown).

The circular mark 10 may be provided at a predetermined interval from a takeoff and landing point 1 on a general runway. In this instance, a diameter of the circular mark 10 is indicated as D, and a distance, that is, a ground range between the takeoff and landing point 1 and the circular mark 10 is indicated as GR. Although the diameter D of the circular mark 10 is set as 10 m in FIG. 1, the present invention is not limited thereto or restricted thereby. When it is possible to clearly collect the image of the circular mark 10 using the camera unit 20 from the distance of about 100 m to 200 m, the diameter D of the circular mark 10 may be readily changed.

The camera unit 20 may be provided to a vertical takeoff and landing (VTOL) aircraft to face a front direction F of the VTOL aircraft. The camera unit 20 may be provided as a charge coupled device (CCD) sensor or a camera generally employed to collect the image of the circular mark 10. More specifically, the camera unit 20 may be provided in a block-and-white camera having a resolution of at least 480×640 to collect the image of the circular mark 10. However, the present invention is not limited thereto or restricted thereby. For example, the camera unit 20 may be provided as a color camera or an infrared camera.

Also, although the camera unit 20 is installed in the VTOL aircraft in the present embodiment, it is only an example and thus the present invention is not limited thereto or restricted thereby. Specifically, the camera unit 20 may be applicable to any type of aircrafts.

When configuring the altitude measurement apparatus, the camera unit 20 may be provided as the black-and-white camera having a minimum resolution in order to save costs. The circular mark 10 may be painted with a luminous paint so that the camera unit 20 may easily collect the image of the circular mark 10.

The calculation unit may include a micro processor generally used to calculate an altitude of the VTOL aircraft based on the collected image.

Hereinafter, a method of measuring, by the altitude measurement apparatus configured as above, an altitude will be described. Initially, the camera unit 20 installed in the VTOL aircraft may collect an image of the circular mark 10.

The collected image of the circular mark 10 is shown in FIG. 3. Next, an actual diameter D of the circular mark 10 and a ground range GR between the circular mark 10 and the takeoff and landing point 1 may correspond to given variables, and a horizontal diameter length x of the image and a vertical diameter length y of the image may be extracted from the image.

As shown in FIG. 3, the image of the circular mark 10 may be transformed and thereby be collected depending on the altitude of the VTOL aircraft, a posture of the VTOL aircraft, and the like.

Referring to FIG. 4, an approximate location according to the altitude of the VTOL aircraft and a pitch angle of the VTOL aircraft may be determined. The pitch angle denotes an angle with respect to an earth surface when a leader moves up and down. A yaw angle denotes an angle with respect to a central line of a fuselage prior to movement when the leader moves right and left. A roll angle denotes a tilted angle of main wings based on the fuselage as an axis.

FIG. 4 illustrates a case where the pitch angle is zero degree. When an angle θ between the earth surface and a sight line of the camera unit 20, a ground range GR between the takeoff and landing point1 and the circular mark 10, and a slant range SR between the circular mark 10 and the camera unit 20 are known, it is possible to calculate the altitude of the VTOL aircraft based on the actual diameter D of the circular mark 10, the ground range GR between the circular mark 10 and the takeoff and landing point 1, the horizontal diameter length x of the image, the vertical diameter length y of the image, and the pitch angle, the roll angle, and the yaw angle of the VTOL aircraft.

Hereinafter, a method of measuring an altitude by an altitude measurement apparatus according to an exemplary embodiment will be described by using a change in a pitch angle, a roll angle, and a yaw angle.

Initially, a case where all of the pitch angle, the roll angle, and the yaw angle are zero degree will be described. When an aircraft photographs an image in a direction where the circular mark 10 is positioned, the circular mark 10 on the ground may look elliptic as shown in FIG. 3. The ratio of y to x may look different depending on an angle between the sight line of the image and the earth surface. Also, as shown in FIG. 4, when the ratio of y to x is calculated, an angle θ between the aircraft and the ground may be calculated as shown in Equation 1 below, and the altitude h may be calculated based on a known ground range GR as shown in Equation 2 below. When the ratio of y/x is calculated based on $\theta=\tan^{-1}(y/x)$, Equation 1 may be induced.

$$\tan(\theta)=y/x; \theta=\tan^{-1}(y/x)$$

$$y/x=1, \theta=45°$$

$$y/x=0.5, \theta=26.57°$$

$$y/x=0.268, \theta=15° \qquad [\text{Equation 1}].$$

$$h=GR\times\tan(\theta)=GR\times\tan(\tan^{-1}(y/x))=GR\times(y/x). \qquad [\text{Equation 2}]$$

Here, x and y denote lengths measured from the image collected by the camera unit 20. For example, although the actual diameter D of the circular mark 10 is 10 m, x and y in a picture may be 1 cm or 5 cm.

For example, when D=10 m, R=100 m, pitch angle=0°, roll angle=0°, yaw angle=0°, y of the image=0.5 cm, and x of the image=1 cm, y/x=0.5 and $\theta=\tan^{-1}(y/x)=26.57°$. Accordingly, the altitude h may be measured as 50 m according to h=GR×(y/x)=100×0.5=50 m.

Figure 5:
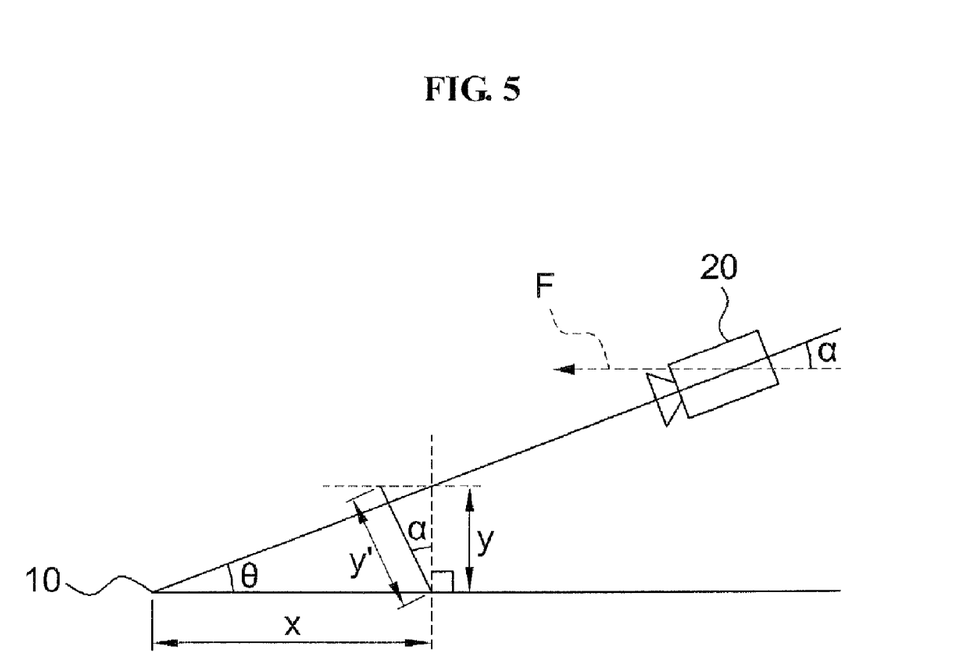
FIG. 5 is a diagram illustrating a case where a pitch angle of an aircraft is not zero degree.

A method of measuring the altitude when the pitch angle is not zero degree, and the roll angle and the yaw angle are zero degree will be described. The pitch angle, the roll angle, and the yaw angle may be given from the aircraft. FIG. 5 is a diagram illustrating a case where a pitch angle of an aircraft is not zero degree.

By substituting y of Equation 3 for y calculated according to above Equation 1 and Equation 2, θ and h may be calculated as shown in Equation 4 and Equation 5 below.

$$\cos(\alpha)=y/y'$$

$$y=y'\cos(\alpha). \qquad [\text{Equation 3}]$$

Here, y' denotes a horizontal diameter length of the image in a case where the pitch angle is not zero degree, and both of the roll angle and the yaw angle are zero degree.

When y of Equation 3 is substituted for y calculated according to above Equation 1 and Equation 2, following Equation 4 and Equation 5 may be induced.

$$\theta=\tan^{-1}(y/x)$$

$$\theta=\tan^{-1}(y'\cos(\alpha)/x). \qquad [\text{Equation 4}]$$

$$h=GR\times(y/x)$$

$$h=GR\times((y'\cos(\alpha))/x). \qquad [\text{Equation 5}]$$

For example, when D=10 m, R=100 m, pitch angle=+10°, roll angle=0°, yaw angle=0°, y' of the image=0.5 cm, and x of the image=1 cm, y=y' cos(α)=0.5×cos(10)=0.4924 cm, y/x=0.4924/1=0.4924, and $\theta=\tan^{-1}(y/x)=26.22°$. Accordingly, h=GR×(y/x)=100×0.4924=49.24 m.

Figure 6:
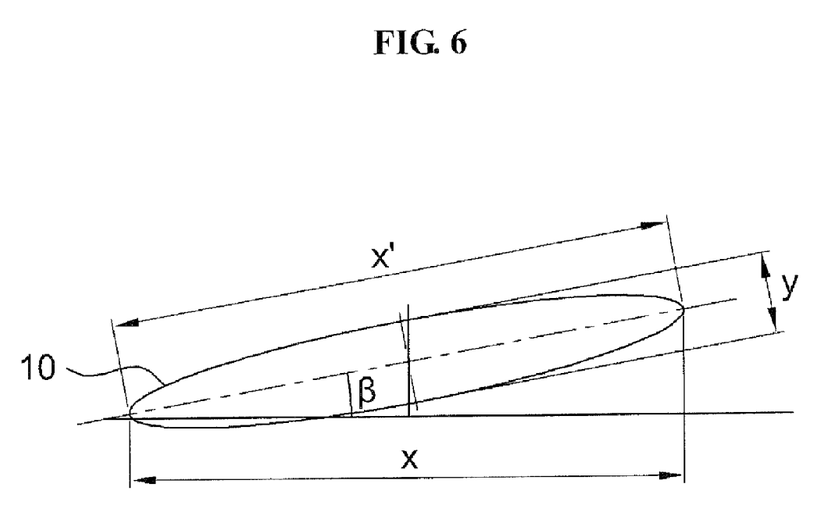
FIG. 6 is a diagram illustrating a case where a roll angle of an aircraft is not zero degree.

Here, due to a size of θ and pitch angle α, an error may occur in the altitude measurement apparatus. However, in the case of a VTOL aircraft, the pitch angle α is significantly small and thus the error may be ignorable. As θ and the pitch angle α become smaller, the accuracy may further increase. Specifically, when θ and the pitch angle α become relatively small, y' may have a length approximately contacting with a line connected by the camera unit 200 and an outer edge of the circular mark 10. Accordingly, the accuracy may increase. Also, to increase the accuracy in altitude measurement, it is possible to use the altitude measurement apparatus by making the altitude measurement apparatus supplement an existing altimeter. Hereinafter, a case where the pitch angle and the roll angle are not zero degree and the yaw angle is zero degree will be described with reference to FIG. 6. FIG. 6 is a diagram illustrating a case where a roll angle of an aircraft is not zero degree.

By substituting x of Equation 6 below for a value of x, θ and h may be calculated as shown in Equation 7 and Equation 8 below. Roll to left or roll to right may be not important and calculation may be performed with respect to either side.

$$\cos(\beta)=x/x'$$

$$x=x'\cos(\beta). \qquad [\text{Equation 6}]$$

$$\theta=\tan^{-1}(y'\cos(\alpha)/x)$$

$$\theta=\tan^{-1}((y'\cos(\alpha))/(x'\cos(\beta))). \qquad [\text{Equation 7}]$$

$$h=GR\times((y'\cos(\alpha))/x)$$

$$h=GR\times((y'\cos(\alpha))/(x'\cos(\beta))) \qquad [\text{Equation 8}]$$

When D=10 m, R=100 m, pitch angle=+10°, roll angle=+5°, yaw angle=0°, y' of the image=0.5 cm, and x' of the image=1 cm, y=y' cos(α)=0.5×cos(10)=0.4924 cm, x=x' cos(β)=1×cos(5)=0.9962 cm, y/x=0.4924/0.9962|0.4943, and $\theta=\tan^{-1}(y/x)=26.30°$. Accordingly, the altitude h may be calculated according to h=GR×(y/x)=100×0.4943=49.43 m.

Figure 7:
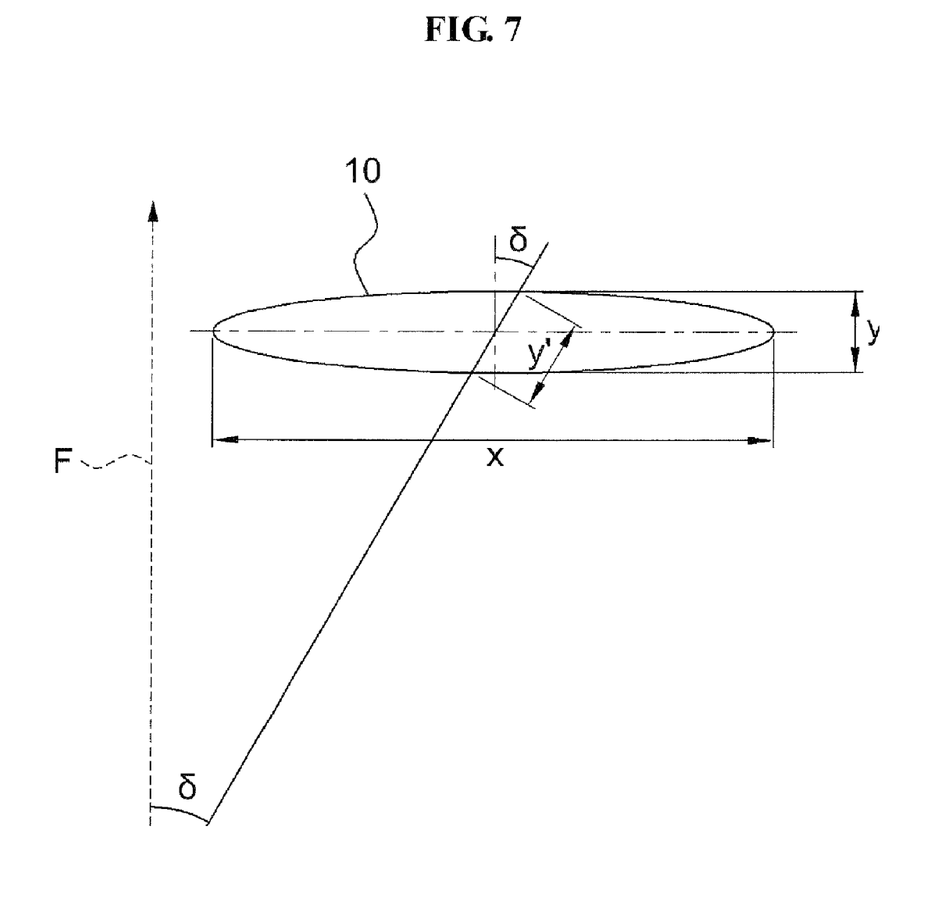
FIG. 7 is a diagram illustrating a case where a pitch angle and a yaw angle of an aircraft are not zero degree.

Hereinafter, a case where all of the pitch angle, the roll angle, and the yaw angle are not zero degree will be described with reference to FIG. 7. FIG. 7 is a diagram illustrating a case where a pitch angle, a roll angle, and a yaw angle of an aircraft are not zero degree.

By substituting y of Equation 9 below for a value of y, θ and h may be calculated as shown in Equation 10 and Equation 11 below.

$$\cos(\delta)=y'/y''$$

$$y'=y''\cos(\delta)$$

$$y=y''\cos(\delta)\cos(\alpha). \qquad [\text{Equation 9}]$$

$$\theta=\tan^{-1}(y'\cos(\alpha)/x'\cos(\beta))$$

$$\theta=\tan^{-1}(y''\cos(\delta)\cos(\alpha)/x'\cos(\beta)). \qquad [\text{Equation 10}]$$

$$h=GR\times((y'\cos(\alpha))/(x'\cos(\beta)))$$

$$h=GR\times((y''\cos(\delta)\cos(\alpha))/(x'\cos(\beta))) \qquad [\text{Equation 11}]$$

Here, y' denotes a length measured from the image when the pitch angle is not zero to degree as shown in FIG. 5. For example, when D=10 m, R=100 m, pitch angle=+10°, roll angle=+5°, yaw angle=+5°, y'' of the image=0.5 cm, and x' of the image=1 cm, y=y'' cos(δ)cos(α)=0.5×cos(5)cos(10) =0.4905 cm, x=x' cos(β)=1×cos(5)=0.9962 cm, y/x=0.4905/0.9962=0.4924, and $\theta=\tan^{-1}(y/x)=26.22°$. Accordingly, the altitude h may be calculated according to h=GR×(y/x)=100× 0.4924=49.24 m.

As described above, according to exemplary embodiments of the present invention, a separate altimeter may not be used and any auxiliary equipment may not be required on the ground. A predetermined circular mark may be required. When an aircraft includes a camera to obtain image information, it is possible to measure an altitude of the aircraft using a structure such as a circular mark provided on the ground. Accordingly, it is possible to configure an altitude measurement apparatus at inexpensive costs.

Also, since the error range may be reduced even at a height approximate to the ground, that is, even in a low altitude less than or equal to 100 m, it is possible to accurately measure the altitude of the aircraft.

Also, since the altitude of the aircraft may be measured using a camera unit collecting an image of the circular mark on the ground, it is possible to measure the altitude of the aircraft regardless of a change in an external environment such as an atmospheric pressure change, an altitude change, and a temperature change.

Although it is described in the present embodiment that the altitude of the VTOL aircraft or the aircraft is measured using only the altitude measurement apparatus, it is only an example. It is also possible to more accurately measure the altitude by using altitude data, measured by the altitude measurement apparatus, for error correction in order to increase an accuracy of a device such as an existing altimeter, for example, a radio altimeter, a pressure altitude sensor, a GPS, or a DPCS, that are generally used to measure an altitude of an airplane.

Specifically, the altitude measurement apparatus may include, as an altimeter (not shown) measuring the altitude, at least one of the GPS, the DGPS, the radio altimeter, and the pressure altitude sensor, and thereby may compare the altitude calculated by the calculation unit with the altitude measured by the altimeter for correction.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An altitude measurement apparatus, comprising:
   a camera unit being provided to a vertical takeoff and landing (VTOL) aircraft to collect an image of a circular mark formed on the ground; and
   a calculation unit to calculate an altitude of the VTOL aircraft based on the collected image, wherein the calculation unit calculates the altitude of the VTOL aircraft based on an actual diameter of the circular mark, a distance between the circular mark and a takeoff and landing point, a horizontal diameter length of the image, a vertical diameter length of the image, and a pitch angle, a roll angle, and a yaw angle of the VTOL aircraft.

2. The altitude measurement apparatus of claim 1, wherein the camera unit is configured to have a resolution of at least 480×640.

3. The altitude measurement apparatus of claim 1, further comprising:
   an altimeter to measure the altitude of the VTOL aircraft, wherein the altimeter comprises at least one of a Global Positioning System (GPS), a Differential Global Positioning System (DGPS), a radio altimeter, and a pressure altitude sensor, and
   the altitude measurement apparatus compares the calculated altitude with the measured altitude to perform correction.

4. An altitude measurement apparatus to calculate an altitude of a vertical takeoff and landing (VTOL) aircraft, wherein the altitude measurement apparatus comprises a camera unit to collect, as an image, a predetermined mark shape provided at a predetermined interval from a takeoff and landing point on ground, and performs calculation through comparison between the collected image and the original mark shape to calculate the altitude of the VTOL aircraft, wherein the predetermined mark shape is a circular mark, and wherein the calculation unit calculates the altitude of the VTOL aircraft based on an actual diameter of the circular mark, a distance between the circular mark and a takeoff and landing point, a horizontal diameter length of the image, a vertical diameter length of the image, and a pitch angle, a roll angle, and a yaw angle of the VTOL aircraft 5. An altitude measurement method, comprising:
   collecting, by an aircraft, an image of a circular mark formed on the ground;
   measuring a horizontal diameter length of the image and a vertical diameter length of the image based on the image; and
   calculating an altitude of the aircraft based on an actual diameter of the circular mark, a distance between the circular mark and a takeoff and landing point, the horizontal diameter length of the image, the vertical diameter length of the image, and a pitch angle, a roll angle, and a yaw angle of the aircraft.

6. The method of claim 5, further comprising:
   comparing the calculated altitude with the altitude measured by at least one of a GPS, a DGPS, a radio altimeter, and a pressure altitude sensor provided in the aircraft, and performing correction.

* * * * *